United States Patent [19]

Walton et al.

[11] 4,255,625

[45] Mar. 10, 1981

[54] CALL PROCESSING MONITOR SYSTEM

[75] Inventors: Richard A. Walton, Bensenville; John Mocko, Jr., Itasca, both of Ill.

[73] Assignee: GTE Automatic Electric Laboratories Incorporated, Northlake, Ill.

[21] Appl. No.: 97,082

[22] Filed: Nov. 23, 1979

[51] Int. Cl.³ ............................................. H04M 3/22
[52] U.S. Cl. ............................................. 179/175.2 D
[58] Field of Search ................. 179/175.2 R, 175.2 C, 179/175.2 D

[56] References Cited

U.S. PATENT DOCUMENTS

| | | | |
|---|---|---|---|
| 3,239,612 | 3/1966 | McAllister | 179/175.2 D |
| 3,497,639 | 2/1970 | Malinich et al. | 179/175.2 R |
| 3,515,820 | 6/1970 | Bereznak | 179/175.2 D |
| 3,692,961 | 9/1972 | Le Strat et al. | 179/175.2 R |
| 3,692,962 | 9/1972 | Raczynski et al. | 179/175.2 R |
| 3,700,830 | 10/1972 | Naylor et al. | 179/175.2 D |
| 3,952,172 | 4/1976 | Penn et al. | 179/175.2 R |
| 4,021,624 | 5/1977 | Kelly et al. | 179/175.2 D |
| 4,076,970 | 2/1978 | Lubarsky, Jr. et al. | 179/175.2 R |

OTHER PUBLICATIONS

"An . . . Automatic Call Sender for Testing . . . Telephone . . . Installations", Mackie, *P.O. Electrical Engineers' Jour.*, vol. 61, Part 3, Oct. 1968, pp. 165-170.

*Primary Examiner*—Thomas A. Robinson
*Attorney, Agent, or Firm*—Robert J. Black; Frank J. Bogacz

[57] ABSTRACT

The present invention is a call processing monitor circuit for dynamically verifying the operation of a telephone switching center. This system provides for continuously testing a telephone switching center's ability to process telephone traffic. This is accomplished by placing telephone calls one at a time from various network inlets to various network outlets in the switching center. For the detection of a predetermined number of consecutive failures, an output alarm signal is generated by the system.

10 Claims, 9 Drawing Figures

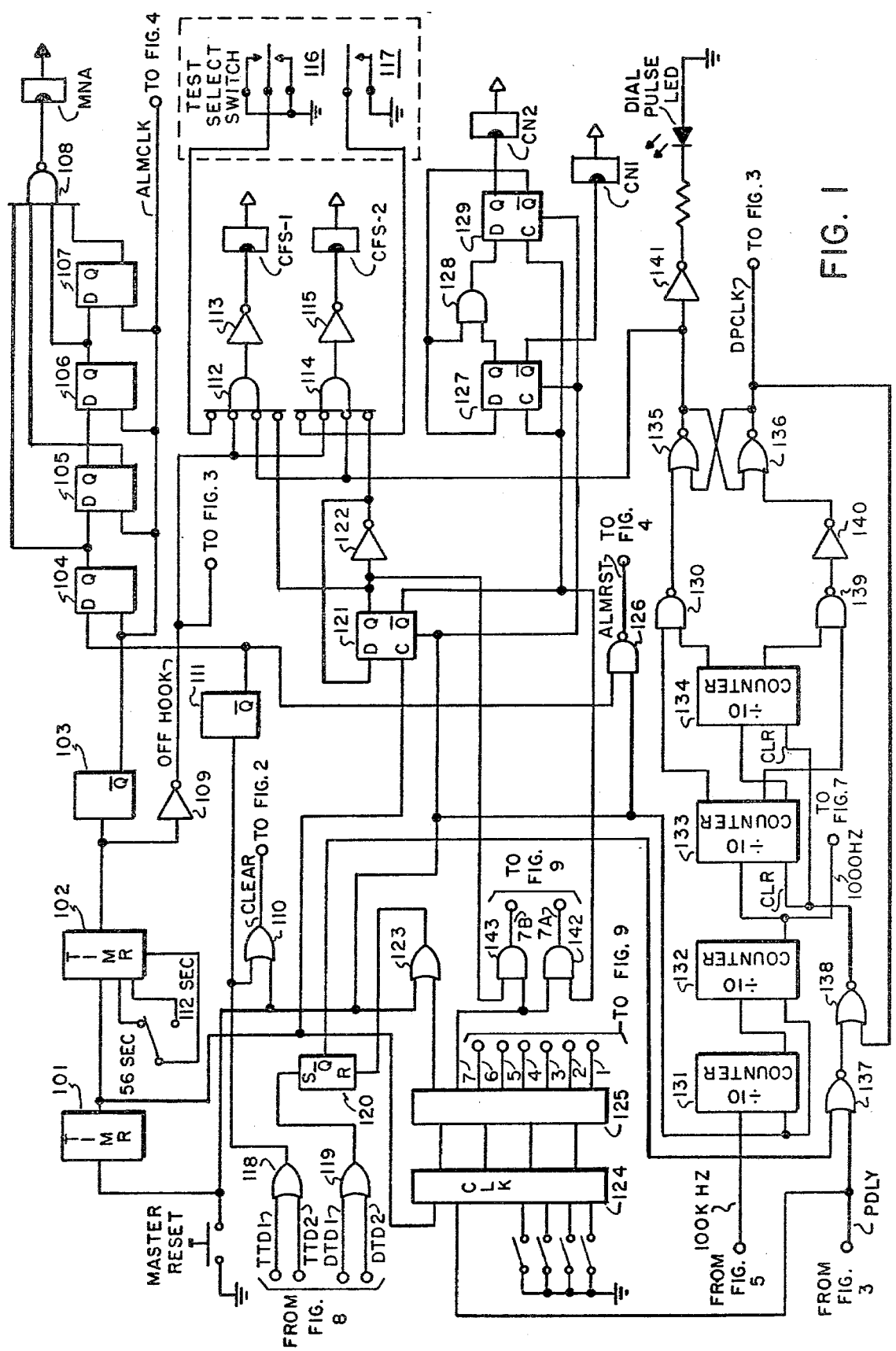

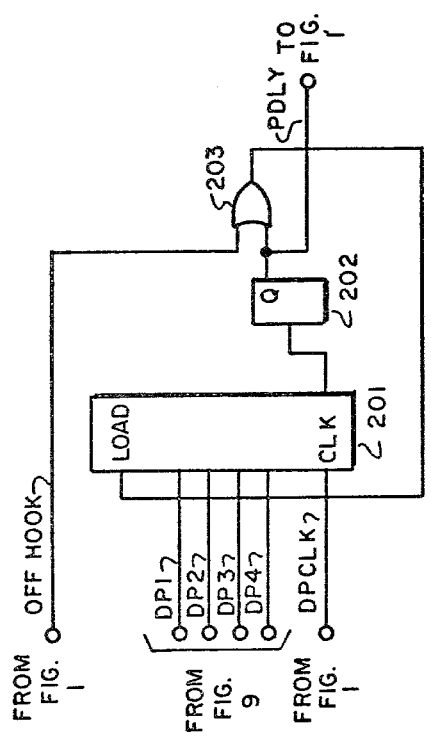
FIG. 3
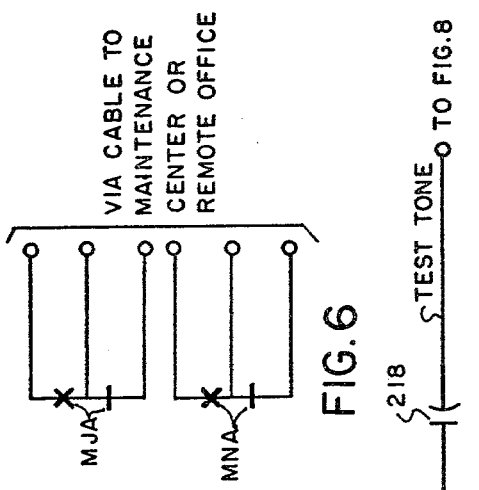
FIG. 6
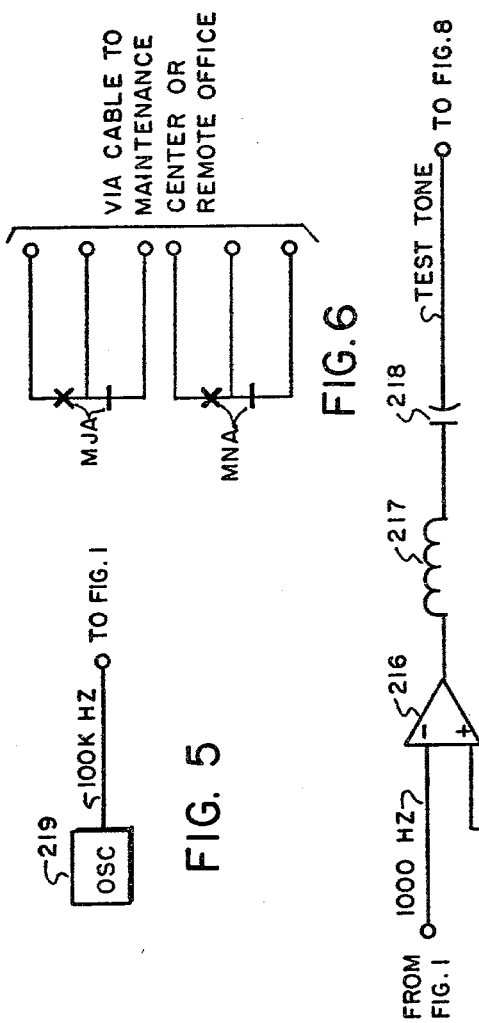
FIG. 7
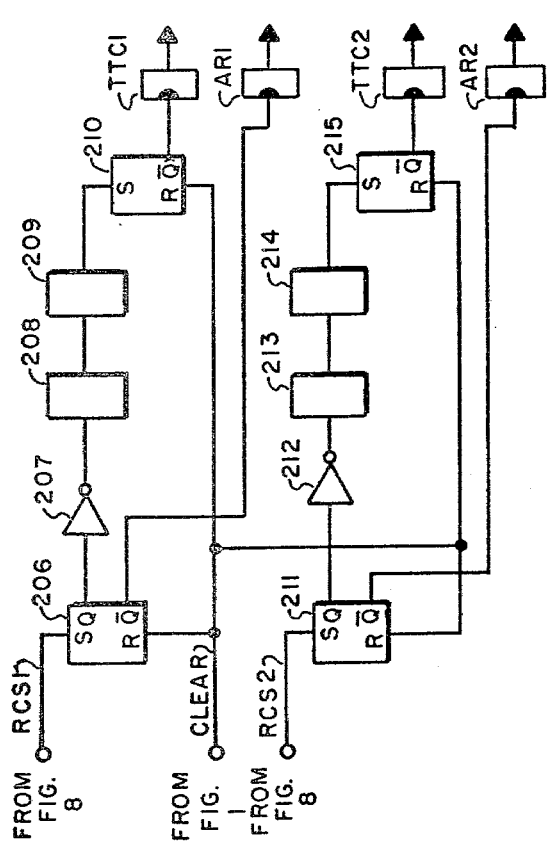
FIG. 2
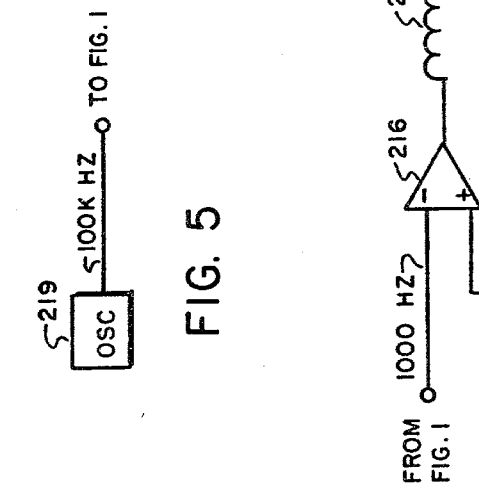
FIG. 5
FIG. 4

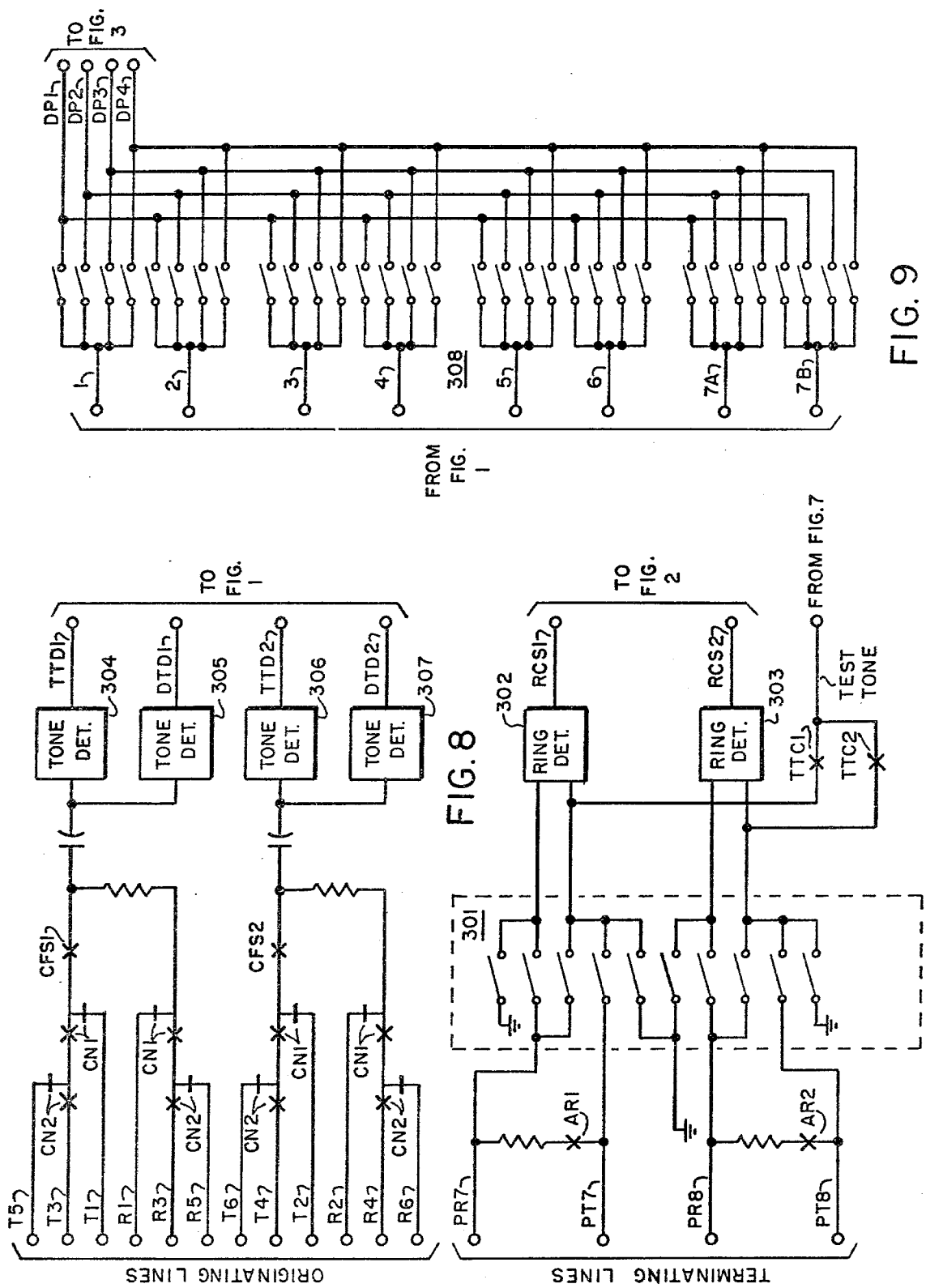

CALL PROCESSING MONITOR SYSTEM

BACKGROUND OF THE INVENTION

(1) Field of the Invention

The present invention pertains to the automated testing of a telephone switching center and more particularly to a call processing monitor system for continually initiating telephone calls and detecting whether each call was properly completed.

(2) Description of the Prior Art

In present date telephony, switching systems are implemented with complex configurations of hardware and software elements. Such switching systems are computer controlled systems and many of such systems have multiprocessor configurations. Each switching system has software which monitors various hardware operations and initiates alarms for the detection of any faults. In a similar fashion, specialized hardware is implemented in order to detect certain software faults.

It is of particular importance to detect those hardware and latent software faults which affect the switching function of a telephone switching center. However, certain faults may go unrecognized or if recognized the system may be incapable of initiating the proper alarm. These faults may inhibit the processing of telephone calls for extended periods of time. Typically, modern switching centers are unattended for substantial periods of time. Thereby, faults which affect the call processing function of the switching center may go undetected. Such switching systems may include No. 1 EAX and No. 2 EAX manufactured by GTE Automatic Electric Inc.

Initially, methods of detecting a call processing service outage consisted of an operator at another office being unable to complete a call to the service affected switching center or a customer who reports the switching center outage from another switching center. Such methods are inadequate and thereby, a community may be without telephone service for an extended period of time.

A partial solution to the problem is taught by U.S. Pat. No. 4,021,624 issued on May 3, 1977, to P. M. Kelly et al, which teaches an automatic call generator which attempts to place calls from one dedicated spot to another. This system employs complex logic and a central processing unit including 16 programs which operate this system.

Another complex solution is taught by U.S. Pat. No. 3,692,962 issued on Sept. 19, 1972, to J. R. Raczynski et al, which teaches an array of up to 5 automatic dialing devices operating independent of one another and producing a count of attempts and failures of each dialing device.

Two other systems which employ computer control for automatic call generation are taught in U.S. Pat. Nos. 3,952,172, issued on Apr. 20, 1976, to C. J. L. Penn et al, and 3,692,961, issued on Sept. 19, 1972, to G. J. LeStrat et al.

Therefore, it is the object of the present invention to provide a call processing monitor system which monitors the call processing ability of a switching center in a simple and economical fashion and provides an alarm output when a particular threshold of consecutive failures is exceeded.

It is a feature of the present invention to provide the above mentioned objective without a central processing unit and any operating software which itself may contain latent errors.

It is another feature of the present invention to provide a self-contained unit independent of the switching center to which it is connected.

It is another feature of the present invention to provide alarm outputs which may be transmitted to a remote location.

SUMMARY OF THE INVENTION

The present invention comprises a call processing monitor system for use in conjunction with a telephone switching center. The telephone switching center includes a plurality of originating and terminating lines for connecting the call processing monitor system to the switching center.

The call processing monitor system includes a relay network connected to each of the originating lines (tip and ring pairs). Dial tone detectors are connected to each of the originating tip and ring pairs and connected to a selection circuit for controlling the telephone digits which are to be transmitted. A digit transmission circuit is connected to the selection circuit for the transmission of all digits representing the telephone number. A digit sequencing circuit is connected between the selection circuit and the transmission circuit providing for the proper timing of the digits and the interval between digits.

Ringing detectors are connected to each of the terminating lines. An answer circuit is connected to each of the ringing detectors. A test tone generation circuit is also connected to the ringing detectors. It provides for the transmission of a tone of frequency 1000 Hz to the switching center via the terminating line. A delay circuit is connected to the test tone generation circuit and provides for proper timing before the test tone is supplied to the terminating line.

Test tone detectors are connected to each of the originating lines and provide for the detection of the 1000 Hz frequency applied by the test tone generation circuit. A timing circuit is connected to each of the test tone detectors and provides an indication of whether the attempted telephone call has been completed timely. Lastly, a programmable threshold counter is connected between the timing circuit and an output relay latch.

When the circuit is initialized, the timing circuit begins to run and the relay network is operated to select one of the originating lines on which to place a call for service to the switching center. Dial tone is transmitted by the switching center and detected by the dial tone detector which is connected to the originating line. When this occurs, the selection circuit selects the first digit for transmission, the transmission circuit outpulses the particular digit and the sequencing circuit provides for proper timing until all the digits comprising the telephone number have been transmitted. Based upon the telephone number transmitted, the switching center establishes a connection between the originating line and the particular terminating line which was dialed. The switching center then applies ringing current to the terminating line. The ringing detector connected to the particular terminating line detects the flow of ringing current and initiates the answer circuit to provide ring trip to the switching center via the terminating line. At this point, there has been a connection established from the originating line through the switching center to the terminating line.

After a ½ second the delay provided by the delay circuit, the test tone generation circuit applies a frequency of 1000 Hz to the terminating line. The test tone detector connected to originating line detects this application of tone and provides a signal to the timing circuit. If the test tone has been detected before the expiration of timing circuit's interval, a successful call has been made through the switching center. The timing circuit then reinitializes the system and provides a successful indication of the completed call. If the timing circuit has expired before the detection of the test tone, the timing circuit provides an indication of a fault.

The threshold counter collects the indications provided by the timing circuit. For a predetermined number of consecutive failures the threshold counter provides an output signal which operates the relay latch to provide a suitable remote or local alarm.

The system also provides the ability to check itself for proper operation. By manual switching, the selection circuit is inhibited from operation on any calls, thereby generating the required number of consecutive failures for operation of the threshold counter and latching the output relay for an alarm condition.

In addition the circuit provides for the manual selection of the telephone numbers to be dialed, the kind of ringing scheme to be detected, the overall timing of the timing circuit and the number of digits to be transmitted.

DESCRIPTION OF THE DRAWINGS

FIGS. 1-9, taken in combination, comprise a schematic diagram of a call processing monitor system embodying the principles of operation of the present invention.

DESCRIPTION OF THE PREFERRED EMBODIMENT

The present invention comprises a call processing monitor system connected between a number of originating and terminating lines of a telephone switching center. Referring to FIGS. 1 through 9, a momentary pushbutton switch master reset is shown connected to timer 101. Timer 101 is connected to flip-flop 121 and flip-flop 121 is connected to AND gates 112 and 114 which in turn are connected to relays CFS-1 and CFS-2 respectively. Flip-flop 121 is connected to flip-flop 127 and to flip-flop 129 which in turn are connected to relays CN1 and CN2 respectively.

Six originating lines connect the call processing monitor system to the telephone switching center. Each of these lines comprises a tip and a ring lead shown in FIG. 8. The first originating line is composed of tip lead T1 and ring lead R1; second line is composed of tip lead T2 and ring lead R2, etc. Relays CFS-1, CFS-2, CN1 and CN2 operate to select on a sequential basis one of the originating lines to generate a call for service to the switching center. Dial tone detectors 305 and 307 of FIG. 8 are connected between the switching center and OR gate 119 of FIG. 1. OR gate 119 is connected to flip-flop 120. Timer 101 is also connected to digit select counter 124 and counter 124 is connected to digit select decoder 125. Digit select decoder 125 and AND gates 142 and 143 are connected to the telephone digit storage array 308 which is shown in FIG. 9. Digit storage array 308 is connected to dial pulse counter 201 shown in FIG. 3. Dial pulse counter 201 is connected to NOR gate 137 of FIG. 1 through monostable 202.

Oscillator 219 of FIG. 5 is connected to counter 131 of FIG. 1. Flip-flop composed of NOR gates 135 and 136 is connected to call for service relays CFS-1 and CFS-2 and operate the relay which initiated the telephone call.

Two terminating lines connect the call processing monitor system to the telephone switching center. These two terminating lines are composed of tip lead PT7 and ring lead PR7 and tip lead PT8 and ring lead PR8 shown in FIG. 8. Ringing detectors 302 and 303 are connected to these terminating lines. Ringing detector 302 is connected through flip-flop 206 of FIG. 2 to answer relay AR1 and in similar fashion ringing detector 303 is connected through flip-flop 211 to answer relay AR2 shown in FIG. 2. The contacts associated with answer relays AR1 and AR2 are shown in FIG. 8 connected between the tip and ring leads of the terminating lines.

The test tone generator shown in FIG. 7 is composed of amplifier 216 and inductor 217 and capacitor 218 and is connected between counter 132 shown in FIG. 1 and each of the terminating lines shown via contacts TTC1 and TTC2 in FIG. 8. Test tone detectors 304 and 306 of FIG. 8 are connected between the originating lines and OR gate 118 of FIG. 1. OR gate 118 is connected to monostable 111 which is connected to failure threshold counter 204 of FIG. 4 through NAND gate 126 via the ALMRST lead shown in FIG. 1. Timer 102 is connected to monostable 103 which in turn is connected to the threshold counter 204 via the ALMCLK lead. In FIG. 4 switches 205 are connected between threshold counter 204 and relay MJA. The contacts of relay MJA are shown in FIG. 6 and are connected to lamp indicators or to a remote location for manual indication to an attendant.

In FIG. 1, timers 101 and 102 may be implemented via an integrated circuit part number NE555 manufactured by Signetics Incorporated. Monostables 103, 111, 208, 209, 213 and 214 may be implemented with an integrated circuit part number MC14528 manufactured by Motorola Incorporated. Digit select counter 124 may be implemented via an integrated circuit part number MC14526 manufactured by Motorola Incorporated. Digit select decoder 125 includes an integrated circuit part number CD4028 manufactured by Radio Corporation of America Incorporated. Counters 131 through 134 of FIG. 1 and 204 shown in FIG. 4 may be implemented with integrated circuit part number MC14017 manufactured by Motorola Incorporated.

In FIG. 3 dial pulse counter 201 may be implemented via integrated circuit part number MC14526 manufactured by Motorola Incorporated. Dial pulse delay monostable 202 includes an integrated circuit part number MC14528 manufactured by Motorola Incorporated. In FIG. 5 oscillator 219 may be implemented via integrated circuit part number NE555 manufactured by Signetics Incorporated. In FIG. 7, operational amplifier 216 may be implemented via integrated circuit part number 1458 manufactured by Signetics Incorporated. In FIG. 8, tone detectors 304 through 307 may be implemented via integrated circuit part number NE567 manufactured by Signetics Incorporated. Ring detectors 302 and 303 include an optical coupler device part number OPI-1083 manufactured by Spectronics Incorporated.

Referring to FIG. 1, when momentary pushbutton master reset is operated the call processing monitor circuit is initialized and all counters and latches reset.

Originating line comprising tip lead T1 and ring lead R1 of FIG. 8 is selected first and the other tip and ring lead pairs are selected sequentially. The call processing monitor system will determine whether a successful call can be completed by the telephone switching center to a terminating line comprising tip lead PT7 and ring lead PR7. In response to master reset initialization, timer 101 times a 30 second interval between successive call attempts by the call processing monitor system. Upon the expiration of timer 101, timer 102 is initiated. Timer 102 is an overall time-out timer measuring the total time allowed for completion of the call. A switchable input to timer 102 determines whether a 56 second or a 112 second interval is selected.

When timer 102 is activated a signal is produced and transmitted through inverter 109 which represents an off-hook indication on the selected originating line. This off-hook signal is then gated through AND gate 112 or 114 to operate relay CFS-1 or CFS-2 respectively, depending upon which originating line in the sequence was selected. In addition, the expiration of timer 101 causes the first digit of the called directory number to be retrieved via the operation of digit select counter 124 and digit select decoder 125. An indication is transmitted from decoder 125 to the appropriate set of switches in the digit storage array 308 of FIG. 9. The value of the particular digit selected is then transmitted from storage array 308 to dial pulse counter 201 of FIG. 3.

When dial tone is detected by tone detector 305 or 307 of FIG. 8, an indication is transmitted to OR gate 119 of FIG. 1 and the dial pulse generating circuit comprising counters 131 through 134 is enabled. The proper number of dial pulses representing the selected digit are then transmitted to the switching center via the particular originating line. These pulses are generated via the dial pulse generator comprising counters 131 through 134 and the operation of flip-flop comprising NOR gates 135 and 136. Each pulse that is transmitted also produces a signal which is transmitted from NOR gate 136 to dial pulse counter 201 of FIG. 3. When dial pulse counter 201 is counted down to zero the digit has been transmitted and monostable 202 is initiated which provides for a 570 MS. delay before retrieving the next digit from the storage array 308 of FIG. 9. At the end of the time interval, monostable 202 has its output go high, thereby causing the next digit value to be loaded into dial pulse counter 201 and enabling the dial pulse generator to transmit this digit. When the last digit to be transmitted has been determined by dial pulse counter 124 (value representing the number of digits is selectable via switches), an output is generated by decoder 125 which resets the dial pulse enable flip-flop 120.

In response to the dialed digits, the telephone switching center will connect a path from the originating line to the particular terminating line which was called. Ringing current supplied by the switching center will be detected by ringing detector 302 or 303 of FIG. 8. This indication is transmitted via the RCS1 or RCS2 lead to flip-flop 206 or 211 respectively of FIG. 2. Answer relay AR1 or AR2 is operated which provides ring trip to the switching center. In addition, the setting of flip-flop 206 or 211 initiates monostable 208 or 213 to provide a 500 Ms. time interval. At the expiration of this interval, test tone connect relay TTC1 or TTC2 is operated to connect a 1000 Hz. frequency to the terminating line. This frequency is generated by oscillator 219 of FIG. 5 having its output counted down by counters 131 and 132 of FIG. 1. This output is then transmitted to amplifier 216 of FIG. 7 through inductor 217 and capacitor 218 to the selected terminating line of FIG. 8.

The test tone is transmitted through the switching center's connection to the originating line. Test tone detector 304 or 306 detects the application of this tone and provides an indication which is transmitted to OR gate 118 of FIG. 1. In response to the detection of the test tone monostable 111 is initiated which provides for a 3.8 millisecond timing interval. Monostable 111 resets the overall timer 102 and in response a monostable 103 is initiated which provides a 2 millisecond timing interval.

As a result, a logic "0" is generated and transmitted via the ALMCLK lead to threshold counter 204 and the counter is not advanced. Counter 204 is reset via a signal generated by gate 126 of FIG. 1. Switches 205 of FIG. 4 may be set to a predetermined value from one to six, so that relay MJA is operated for detection of a consecutive failure count of the value set via the closing of one of the switches 205. Relay MNA whose corresponding contacts are shown in FIG. 6.

Additionally, the selection circuitry is operated so that the next tip and ring pair are selected for placing the telephone call.

If test tone is not detected by tone detectors 304 or 306 the expiration of overall timer 102 causes a logic "1" to be generated and transmitted via the ALMCLK lead to counter 204. When the predetermined threshold count is achieved by the proper number of consecutive failures, relay MJA is operated. Test select switch comprising contacts 116 and 117 may be operated to inhibit the selection circuitry gates 112 and 114 from operating on a consecutive basis. Thereby, the consecutive threshold count is reached and relay MJA is operated.

Manual selection of a particular ringing scheme may be accomplished via switches 301 of FIG. 8. The overall timing interval for call completion is selectable via a switch connected to timer 102 shown in FIG. 1. The number of digits to be transmitted by the call processing monitor system is selectable via switches connected to counter 124. The particular telephone numbers to be called are selectable via switch array 308 of FIG. 9. The consecutive failure threshold limit may be set via switches 205 of FIg. 4. All the above mentioned switches may be implemented via dual in line package switches in order to conserve space.

Contacts MJA shown in FIG. 6 may be connected to operate a lamp located within the telephone switching center or connected to a transmission line to operate a remotely located lamp or other suitable device.

Although a preferred embodiment of the invention has been illustrated, and that form described in detail, it will be readily apparent to those skilled in the art that various modifications may be made therein without departing from the spirit of the invention or from the scope of the appended claims.

What is claimed is:

1. A call processing monitor system for dynamically verifying the operation of a telephone switching center including initialization means, a plurality of originating lines each connected to said switching center and a plurality of terminating lines each connected to said switching center, said call processing monitor system comprising:

means for selecting one of a plurality of said originating lines, said selecting means operated in response to said initialization means;

dial tone detection means connected to each of said plurality of originating lines and operated to detect application of dial tone by said switching center;

second means for selecting digit values representing a telephone directory number operated in response to said operation of said dial tone detection means;

means for transmitting said digit values connected to said second selecting means;

means for sequencing said digit values for transmission connected to said transmission means;

ring detection means connected to said terminating line and operated to detect a complete path from said originating line to said terminating line through said switching center;

answer means connected to said ring detection means and operated in response to said operation of said ring detection means to produce a signal representing an off-hook condition;

test tone generation means connected to said answer means and operated in response to said off-hook condition to produce a test tone of a particular frequency;

delay means connected to said answer means and operated in response to said off-hook condition to connect said generated test tone to said terminating line;

test tone detection means connected to said originating line for detection of said complete path through such switching center whereby a first output signal is produced representing the detection of said complete path;

timing means connected to said initialization means and to said test tone detection means, said timing means operate to time a predetermined interval whereby upon expiration of said interval a second output signal of a first characteristic is produced and alternatively for detection of said test tone a second output signal of a second characteristic is produced;

threshold counting means connected to said timing means and operated in response to a plurality of second output signals of a said first characteristic to detect a consecutive accumulation of said second output signals whereby a third output signal is produced representing said consecutive accumulation attaining a predetermined threshold limit; and latching means connected to said threshold counting means and operated in response to said third output signal to produce a fourth output signal representing an indication of consecutive failures of said call processing monitor system.

2. A call processing monitor system as claimed in claim 1, wherein: said threshold counting means includes manually programmable memory means which contains said threshold limit value N where N is an integer value representing a predetermined threshold limit.

3. A call processing monitor system as claimed in claim 1, wherein: said timing means includes switching means whereby at least two distinct timing intervals are manually selectable.

4. A call processing monitor system as claimed in claim 1, wherein: said second selecting means includes fully programmable memory means whereby any telephone directory number is selectable.

5. A call processing monitor system as claimed in claim 1, wherein: there is further included routing means connected to said initialization means and operated to inhibit the operation of said first selection means whereby said threshold limit of said consecutive failures is produced and said fourth output signal generated.

6. A call processing monitor system as claimed in claim 1, wherein: said first selecting means includes switching means for sequentially selecting each of said plurality of originating lines.

7. A call processing monitor system as claimed in claim 1, wherein: said second selecting means further includes switching means for sequentially selecting each of said plurality of terminating lines corresponding to a telephone directory number.

8. A call processing monitor system as claimed in claim 1, wherein: said second selecting means further includes dial pulse generating means connected between said second selecting means and one of said plurality of said originating lines for transmitting a series of pulses representing each of said digits of said telephone directory number.

9. A call processing monitor system as claimed in claim 8, wherein there is further included: a clock circuit connected to said test tone generation means and to said dial pulse generating means.

10. A call processing monitor system as claimed in claim 1, wherein: said ring detection means includes a plurality of ring detection circuits, each circuit connected to a particular terminating line and each including an optical coupler device.

* * * * *